United States Patent
Brown et al.

(10) Patent No.: US 10,621,693 B2
(45) Date of Patent: Apr. 14, 2020

(54) 2D MULTI-COORDINATE ADAPTIVE DYNAMICS PROGRAMMING METHOD FOR ROBUST DOCUMENT REGISTRATION

(71) Applicant: Ancestry.com Operations Inc., Lehi, UT (US)

(72) Inventors: Laryn Brown, Highland, UT (US); Michael Murdock, Lehi, UT (US); Jack Reese, Lindon, UT (US); Shawn Reid, Orem, UT (US)

(73) Assignee: ANCESTRY.COM OPERATIONS INC., Lehi, UT (US)

(*) Notice: Subject to any disclaimer, the term of this patent is extended or adjusted under 35 U.S.C. 154(b) by 197 days.

(21) Appl. No.: 15/392,997

(22) Filed: Dec. 28, 2016

(65) Prior Publication Data

US 2018/0182112 A1 Jun. 28, 2018

(51) Int. Cl.
| | | |
|---|---|---|
| *G06T 3/00* | (2006.01) | |
| *G06K 9/00* | (2006.01) | |
| *G06K 9/62* | (2006.01) | |

(52) U.S. Cl.
CPC ........ *G06T 3/0081* (2013.01); *G06K 9/00449* (2013.01); *G06K 9/6206* (2013.01)

(58) Field of Classification Search
None
See application file for complete search history.

(56) References Cited

U.S. PATENT DOCUMENTS

| | | | | |
|---|---|---|---|---|
| 8,073,256 B2* | 12/2011 | Nozaki | ................. | G06F 17/248 382/181 |
| 8,903,810 B2* | 12/2014 | Ismalon | .............. | G06F 16/3322 707/723 |
| 8,995,770 B2* | 3/2015 | Kennard | ............ | G06K 9/00852 382/187 |
| 2002/0102022 A1* | 8/2002 | Ma | ..................... | G06K 9/00456 382/170 |
| 2004/0081332 A1* | 4/2004 | Tuttle | ................. | G06K 9/00442 382/100 |
| 2006/0114485 A1* | 6/2006 | Sato | .................. | G06F 17/30271 358/1.13 |

(Continued)

OTHER PUBLICATIONS

Rodriguez-Serrano, José A., and Florent Perronnin. "Handwritten word-spotting using hidden Markov models and universal vocabularies." Pattern Recognition 42.9 (2009): 2106-2116.*

(Continued)

*Primary Examiner* — Andrae S Allison
(74) *Attorney, Agent, or Firm* — Kilpatrick Townsend & Stockton LLP

(57) ABSTRACT

Systems and methods for registering documents. A two-dimensional document image and one or more form images may be obtained. The document image may be projected onto a horizontal axis and a vertical axis to create a horizontal document projection and a vertical document projection. The form images may be projected onto the horizontal axis and the vertical axis to create a horizontal form projection and a vertical form projection. The horizontal document projection may be correlated with the horizontal form projection of the form images and the vertical document projection may be correlated with the vertical form projection of the form images. Correlation scores may be calculated based on the correlations.

20 Claims, 12 Drawing Sheets

(56) References Cited

U.S. PATENT DOCUMENTS

| | | | |
|---|---|---|---|
| 2007/0014467 A1* | 1/2007 | Bryll | G06K 9/4609 382/152 |
| 2007/0217676 A1* | 9/2007 | Grauman | G06K 9/4671 382/170 |
| 2007/0263233 A1* | 11/2007 | Mei | H04N 1/3877 358/1.2 |
| 2010/0310115 A1* | 12/2010 | Lin | G06K 9/00442 382/100 |
| 2012/0076413 A1* | 3/2012 | Ferman | G06K 9/00469 382/176 |
| 2013/0077863 A1* | 3/2013 | McCombs | G06K 9/00469 382/176 |
| 2013/0080149 A1* | 3/2013 | McCombs | G06F 17/278 704/9 |
| 2014/0064621 A1* | 3/2014 | Reese | G06F 17/30256 382/190 |
| 2016/0063321 A1* | 3/2016 | Reese | G06K 9/00463 382/187 |
| 2018/0181843 A1* | 6/2018 | Brown | G06K 9/6269 |

OTHER PUBLICATIONS

Kchaou et al, Segmentation and Word Spotting Methods for Printed and Handwritten Arabic Texts: A Comparative Study, 2012 International Conference on Frontiers in Handwriting Recognition.*

Rath, Tony M., and Rudrapatna Manmatha. "Word spotting for historical documents." International Journal of Document Analysis and Recognition (IJDAR) 9.2-4 (2007): 139-152.*

Giotis, Angelos P., et al. "A survey of document image word spotting techniques." Pattern Recognition 68 (2017): 310-332.*

Bhardwaj, Anurag, Damien Jose, and Venu Govindaraju. "Script independent word spotting in multilingual documents." Proceedings of the 2nd workshop on Cross Lingual Information Access (CLIA) Addressing the Information Need of Multilingual Societies. 2008.*

Liang et al, Geometric Rectification of Camera-captured Document Images, IEEE Transactions on Pattern Analysis and Machine Intelligence, vol. X, No. X, YY 2006 (Year: 2006).*

* cited by examiner

FIG. 1

2D MULTI-COORDINATE ADAPTIVE DYNAMICS PROGRAMMING METHOD FOR ROBUST DOCUMENT REGISTRATION

BACKGROUND OF THE INVENTION

The genealogical and historical document communities have recognized the value in unlocking and providing access to historical documents in digital format as digitized images with indexed, searchable, enhanced, viewable data. Furthermore, leaders in the industry leverage image processing algorithms to better enhance and present document images to viewers. The ability to properly register, segment, and field the information on documents are prerequisite steps for higher-level operations such as handwriting recognition, hit-highlighting, context-aware tips and pop-ups, etc.

Unfortunately, many historical documents are damaged or degraded due to age, poor preservation, deterioration, and damage resulting from both man-made and natural disasters. Portions of pages may be burned, faded, torn, obscured, water-damaged, or otherwise missing or unreadable. Hence, robust methods for document registration that work reliably with historical documents are needed.

BRIEF SUMMARY OF THE INVENTION

A computer-implemented method for registering documents is provided. The method may include obtaining a document image, the document image being at least two-dimensional. The method may include obtaining one or more form images. Each of the one or more form images may be at least two-dimensional. The method may include projecting the document image onto one or both of a horizontal axis and a vertical axis to create one or both of a horizontal document projection and a vertical document projection. The method may include projecting each of the one or more form images onto one or both of the horizontal axis and the vertical axis to create one or both of a horizontal form projection and a vertical form projection. The method may include correlating either the horizontal document projection with the horizontal form projection of at least one of the one or more form images, or the vertical document projection with the vertical form projection of at least one of the one or more form images.

In some embodiments, the method may include projecting the document image both onto the horizontal axis to create the horizontal document projection and onto the vertical axis to create the vertical document projection. In some embodiments, the method may include projecting each of the one or more form images both onto the horizontal axis to create the horizontal form projection and onto the vertical axis to create the vertical form projection. In some embodiments, the method may include correlating the horizontal document projection with the horizontal form projection of each of the one or more form images to create one or more horizontal correlation functions. In some embodiments, the method may include correlating the vertical document projection with the vertical form projection of each of the one or more form images to create one or more vertical correlation functions. In some embodiments, the method may include calculating a horizontal correlation score for each of the one or more form images by averaging each of the one or more horizontal correlation functions. In some embodiments, the method may include calculating a vertical correlation score for each of the one or more form images by averaging each of the one or more vertical correlation functions. In some embodiments, the method may include combining the horizontal correlation score with the vertical correlation score for each of the one or more form images to create combined scores. In some embodiments, the method may include determining which of the one or more form images corresponds to the document image by determining a maximum score of the combined scores.

In some embodiments, the method may include determining a missing portion and an available portion of the document image. In some embodiments, the method may include determining a horizontal weighting function by projecting the missing portion and the available portion onto the horizontal axis. In some embodiments, the method may include determining a vertical weighting function by projecting the missing portion and the available portion onto the vertical axis. In some embodiments, the method may include calculating a weighted horizontal correlation score for each of the one or more form images by performing a weighted average of each of the one or more horizontal correlation functions using the horizontal weighting function. In some embodiments, the method may include calculating a weighted vertical correlation score for each of the one or more form images by performing a weighted average of each of the one or more vertical correlation functions using the vertical weighting function. In some embodiments, the method may include combining the weighted horizontal correlation score with the weighted vertical correlation score for each of the one or more form images to create combined scores. In some embodiments, the method may include determining which of the one or more form images corresponds to the document image by determining a maximum score of the combined scores.

In some embodiments, combining the weighted horizontal correlation score with the weighted vertical correlation score may include either adding or averaging the scores. In some embodiments, the method may include rotating the document image such that the document image is vertically aligned with the vertical axis and horizontally aligned with the horizontal axis. In some embodiments, the method may include stretching the horizontal document projection over the horizontal axis such that the horizontal document projection either increases or decreases in length. In some embodiments, the method may include stretching the vertical document projection over the vertical axis such that the vertical document projection either increases or decreases in length. In some embodiments, the document image may be an image of a family history document and the one or more form images may be images of one or more form types for family history documents.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

FIG. 1 illustrates a damaged document and a plurality of forms, according to an embodiment of the present disclosure.

Figure 2:
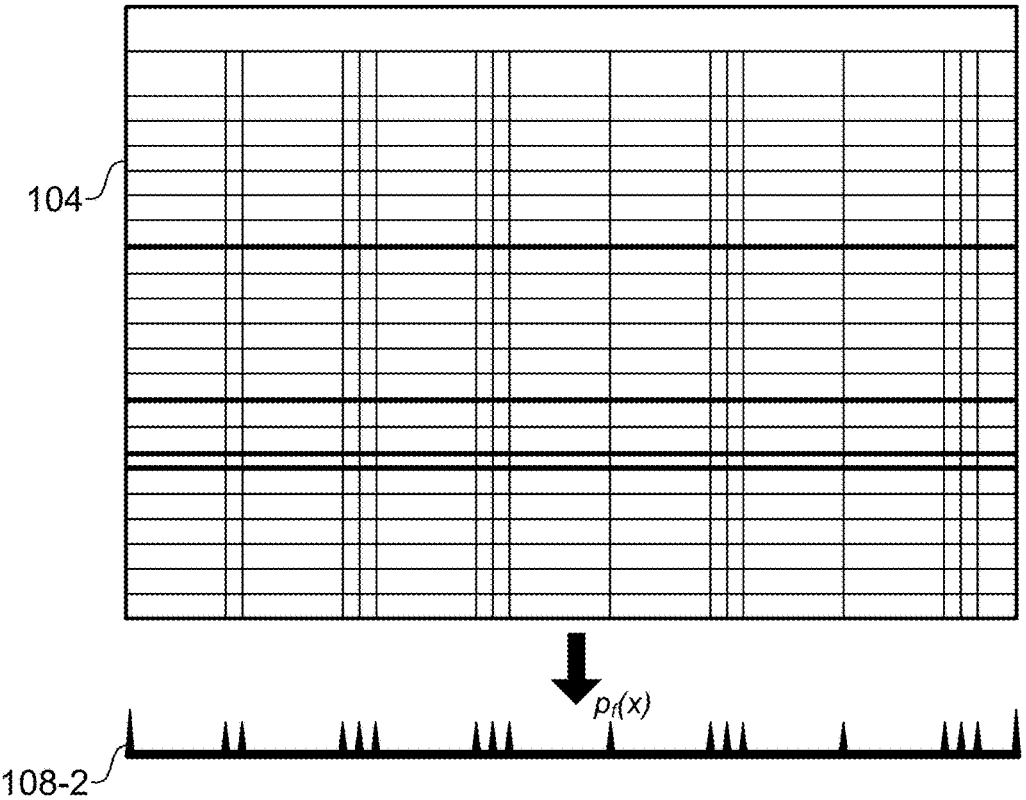
FIG. 2 illustrates horizontal and vertical projections of a damaged document and a form, according to an embodiment of the present disclosure.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Embodiments of the present disclosure provide a novel and robust approach for registering damaged historical documents that are too difficult to register using off-the-shelf office document registration algorithms. Current approaches to solving the problem of document registration frequently rely on locating document page corners, borders, or perhaps a few key points of interest within the document. Since only three points are required to "fix a plane" in 3D space, the corner finding, and key-point finding approaches have been sufficient for working with modern office documents, but have proven inadequate and unreliable when applied to historical and/or damaged documents.

Embodiments of the present disclosure leverage algorithms from the field of speech recognition to solve the problem of registering noisy signals in digital images of damaged historical documents. In speech recognition, dynamic time warping (DTW) algorithms are used to match spoken words with expected words (for example, in a telephone voice response system, or SIRI-like voice activated speech recognition system). These algorithms are tolerant of temporal variation-words being spoken faster, or slower, or even at variable rate, are robust to variations in pitch (high or low) and volume (loud or soft), and are tolerant of longer or shorter delays at the beginning or ending of the speech signal.

Embodiments of the present disclosure adapt several features of 1D algorithms from the speech recognition domain for use in 2D image processing. Embodiments of the present disclosure enable robust recognition and registration of document profile signals even in cases where the historical documents are severely deteriorated or damaged. This is accomplished, in part, by observing that projected profiles of 2D documents along a given axis yield a 1D signal similar to a 1D audio signal. The realm of 1D projections that can take on 2D document images include, but are not limited to, enhanced line projection profiles, blank space projection profiles, connected component projection profiles, machine-print projection profiles, handwriting projection profiles, black-run projection profiles, white-run projection profiles, intensity projection profiles, gradient magnitude projection profiles, gradient orientation projection profiles, etc. Given an ample set of 1D signals, the 1D DTW algorithms from speech recognition may be adapted for use with the image data. Just as the DTW algorithms are robust to variations in rate, pitch, volume, etc. in speech recognition, embodiments of the present disclosure are robust to image variations in scale, translation, cropping, aspect ratio, intensity, noise, fading, blurring, and even significantly damaged documents where entire sections, even more than half of the image, may be damaged, obscured, or even completely missing.

Unlike other approaches, embodiments of the present disclosure are independently scale invariant along the X and Y axes. This is important because some scanning hardware for historical documents (particularly microfilm scanners) do not preserve aspect ratio and, in fact, exhibit some variability in aspect ratio between scanned images. Additionally, embodiments of the present disclosure are independently translation invariant on the X and Y axes. This is important because documents may be damaged or, more commonly, mis-cropped in the X axis, the Y axis, or both. In addition to being scale and translation invariant, some embodiments of the present disclosure provide rotational invariance, which is a significant advantage compared to other algorithms that are not rotationally invariant.

Figure 1:
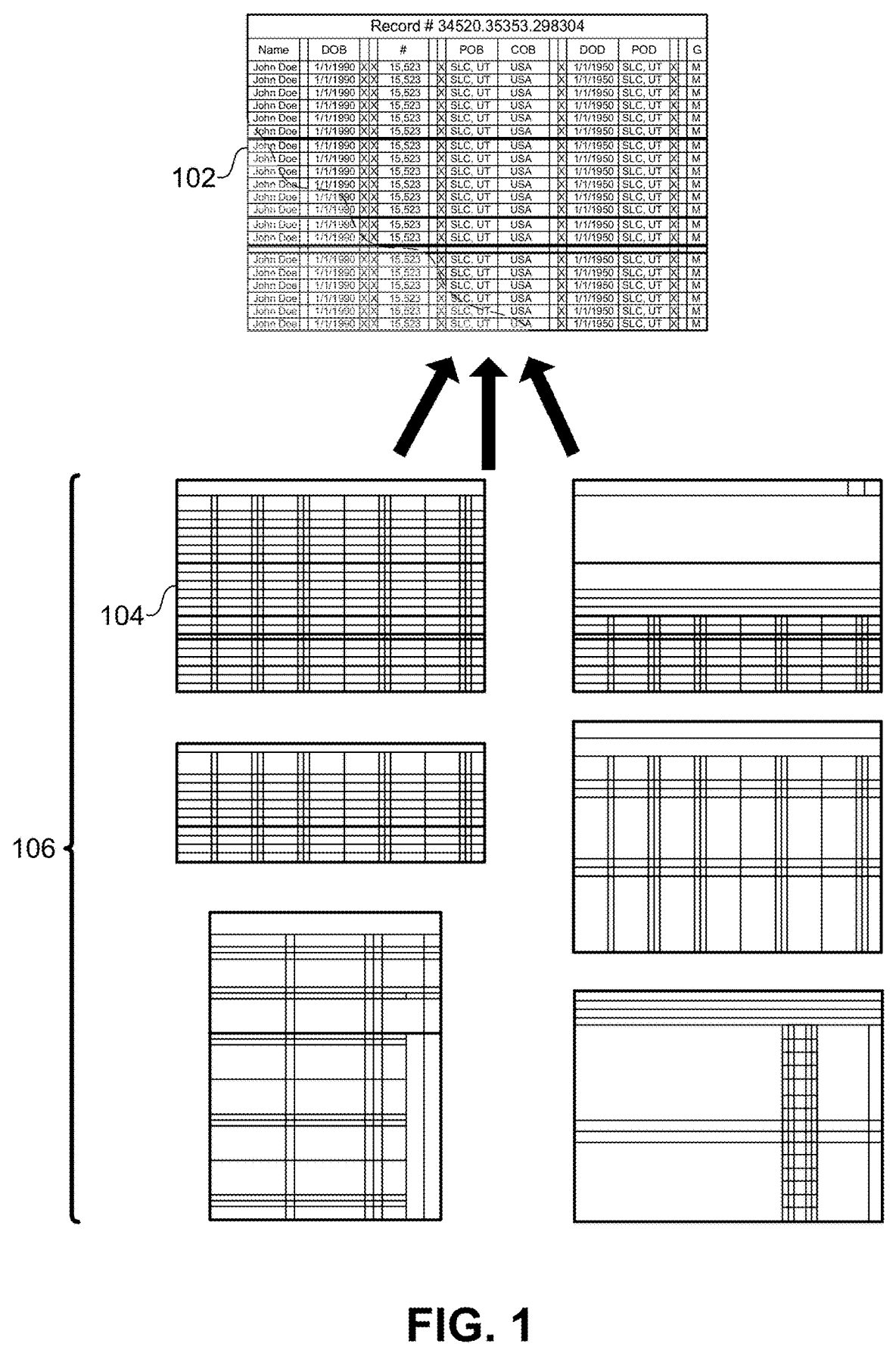

FIG. 1 illustrates a damaged document 102 and a database of forms 106, according to an embodiment of the present disclosure. In some embodiments, an objective of the present disclosure includes determining which of several possible forms is associated with a damaged document. In some embodiments, database of forms 106 includes a form 104 which may be similar and/or identical to damaged document 102 if the damaged portions were in an original state. Form 104 may also be a template version of damaged document 102 with empty entries, as shown in FIG. 1. Database of forms 106 may include forms of different sizes and configurations, and may be obtained by analyzing large numbers of historical documents to determine common structures and templates.

FIG. 2 illustrates horizontal projections 108 and vertical projections 110 of damaged document 102 and form 104, according to an embodiment of the present disclosure. Horizontal projections 108 include horizontal document projection 108-1 (denoted as $p_d(x)$) and horizontal form projection 108-2 (denoted as $p_f(x)$). Vertical projections 110 include vertical document projection 110-1 (denoted as $p_d(y)$) and vertical form projection 110-2 (denoted as $p_f(y)$). Projections may be obtained by performing mathematical operations along an axis. For example, in some embodiments, horizontal projections are obtained by a summation of all pixel values at each x value and vertical projections are obtained by a summation of all pixel values at each y value. Pixel values may be an RGB value, a darkness value, a lightness value, or some other value. In some embodiments, horizontal projections are obtained by an averaging of all pixel values at each x value and vertical projections are obtained by an averaging of all pixel values at each y value. Horizontal and vertical projections may be filtered to improve smoothness or reduce outliers that may distort the analysis.

Figure 3:
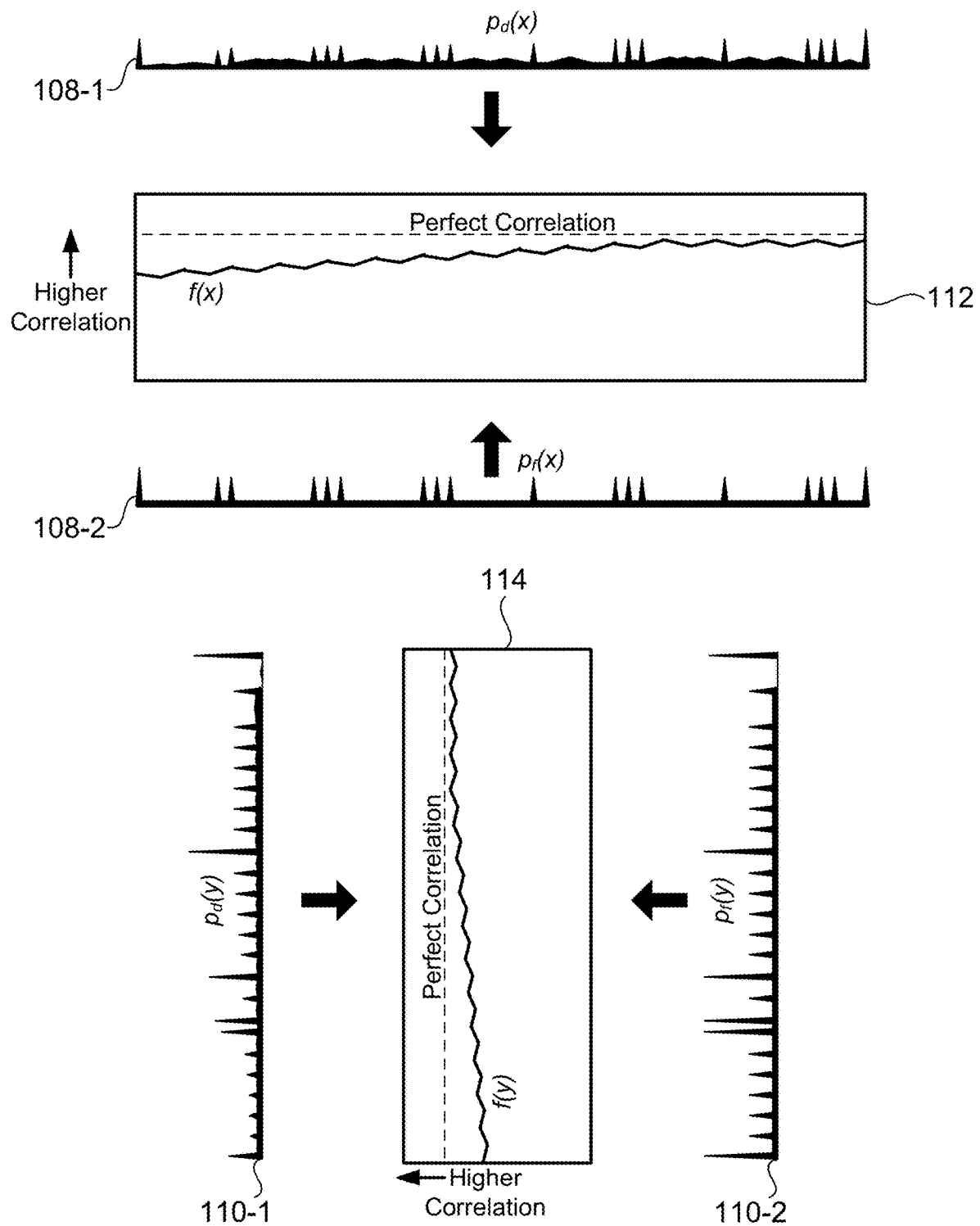
FIG. 3 illustrates horizontal and vertical correlations between a damaged document and a form, according to an embodiment of the present disclosure.

FIG. 3 illustrates horizontal and vertical correlations between damaged document 102 and form 104, according to an embodiment of the present disclosure. In some embodiments, correlating horizontal document projection 108-1 with horizontal form projection 108-2 creates a horizontal correlation function 112 (denoted as $f(x)$), and correlating vertical document projection 110-1 with vertical form projection 110-2 creates a vertical correlation function 114 (denoted as $f(y)$). In some embodiments, correlating two projections yields a correlation function in accordance with the traditional correlation function used in statistics. In some embodiments, correlating two projections includes determining the similarity in values between the two projections, such that two projections that are identical would yield a correlation function equal to 100% or 1 at all values of the independent variable (either x or y). In some embodiments, correlating two projections includes determining the difference or error between the two projections, such that two projections that are identical would yield a correlation function equal to 0% or 0 at all values of the independent variable (either x or y). For example, the correlation function may be equal to the square of the difference between the two projections, such as if $p_d(x)=3$ at x=5 and $p_f(x)=6$ at x=5, then $f(x)=(3-6)^2=9$ at x=5.

In some embodiments, correlating two projections (or signals) includes identifying the peaks in each of the two projections and aligning the two projections such that their peaks are aligned as close as possible. Documents and forms generally include strong vertical and horizontal lines which cause significant peaks in horizontal and vertical projections. This feature of the projections can be exploited by ignoring all content of the projections except for the peaks. In some embodiments, all peaks above a certain x value threshold or y value threshold are considered in the correlation. The correlation function may be related to the error in the independent variable between peaks of the two projections. For example, if horizontal document projection 108-1 has a peak at x=324 and horizontal form projection 108-2 has a peak at x=368, then horizontal correlation function 112 may have low values (indicating poor correlation) between 324<x<368. By way of another example, if both horizontal document projection 108-1 and horizontal form projection 108-2 have peaks at x=345, then horizontal correlation function 112 may have a high value (indicating good correlation) at x=345. The magnitude of the peaks may also influence the correlation function. For example, peaks in the two projections that are similar in magnitude indicate better correlation than peaks that differ substantially in magnitude.

Figure 4:
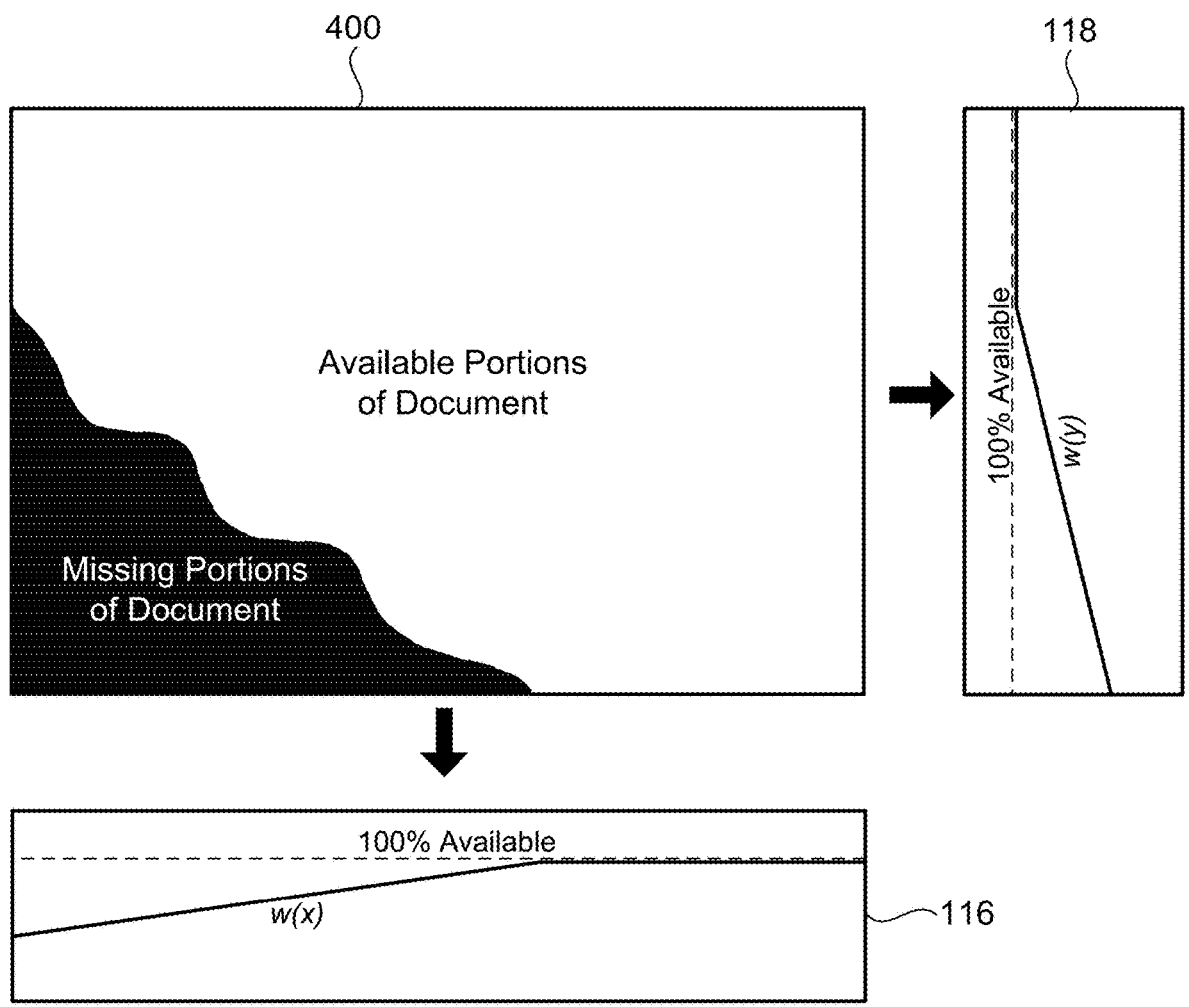
FIG. 4 illustrates weighting functions of a damaged document, according to an embodiment of the present disclosure.

FIG. 4 illustrates weighting functions 116 and 118 of damaged document 102, according to an embodiment of the present disclosure. In some embodiments, damaged document 102 may be partitioned into available portions and missing portions to create a partitioned document 400. Partitioned document 400 is similar in size to damaged document 102, and may include a first value (such as 1) in portions that are determined to be available and may include a second value (such as 0) in portions that are determined to be missing. Horizontal weighting function 116 (denoted as w(x)) and vertical weighting function 118 (denoted as w(y)) may then be obtained in a similar manner to horizontal projections 108 and vertical projections 110. In some embodiments, weighting functions 116 and 118 represent the percentage of availability of partitioned document 400 at each value of the independent variable (either x or y). Weighting functions 116 and 118 may facilitate the analysis by providing a confidence level to horizontal projections 108, vertical projections 110, horizontal correlation function 112, and vertical correlation function 114. For example, a document projection in which a large portion of the document is missing may be particularly distorted along portions with a low percentage of availability. Such portions may be less reliable than portions with a high percentage of availability.

Figure 5A:
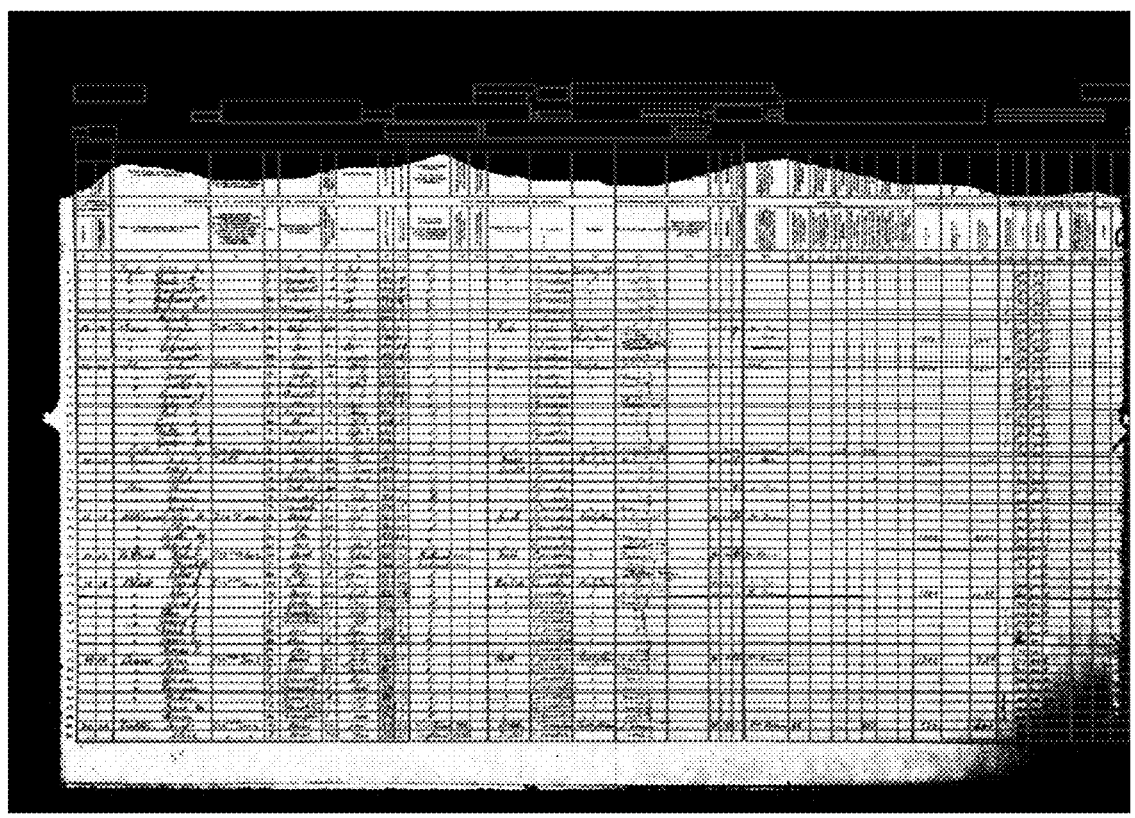
FIGS. 5A-5H illustrate various damaged documents, according to an embodiment of the present disclosure.
Figure 5B:
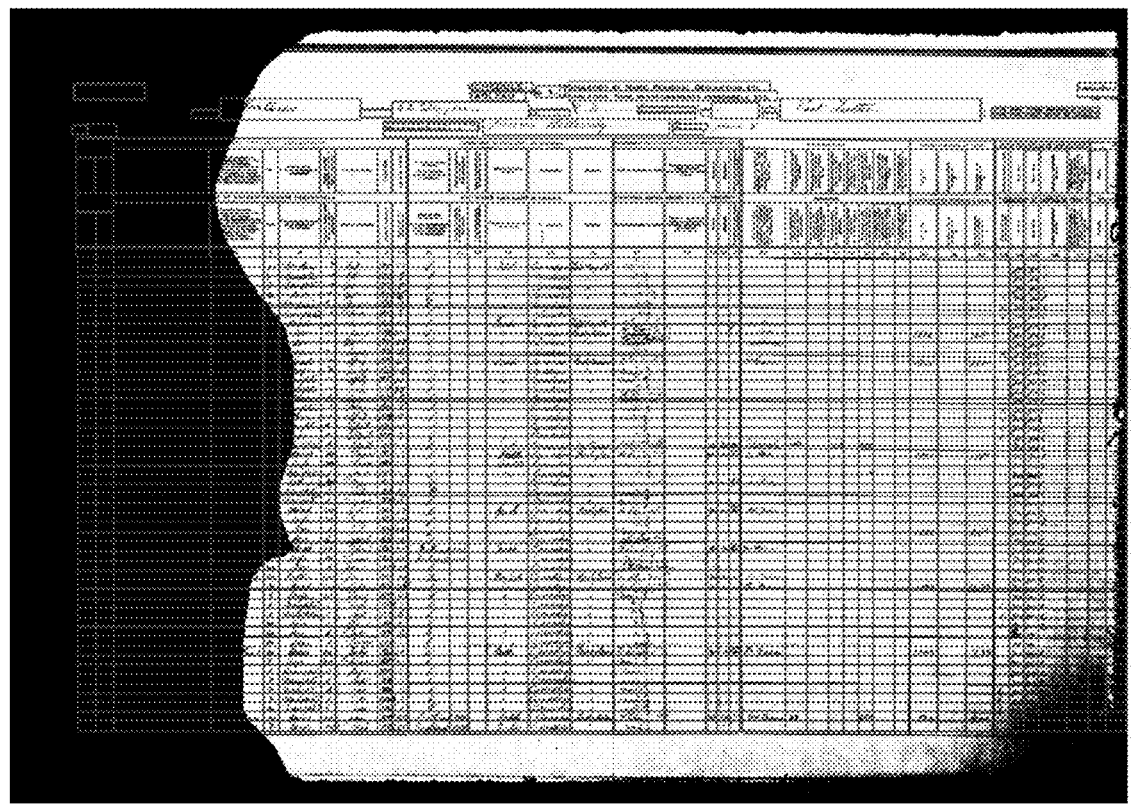
Figure 5C:
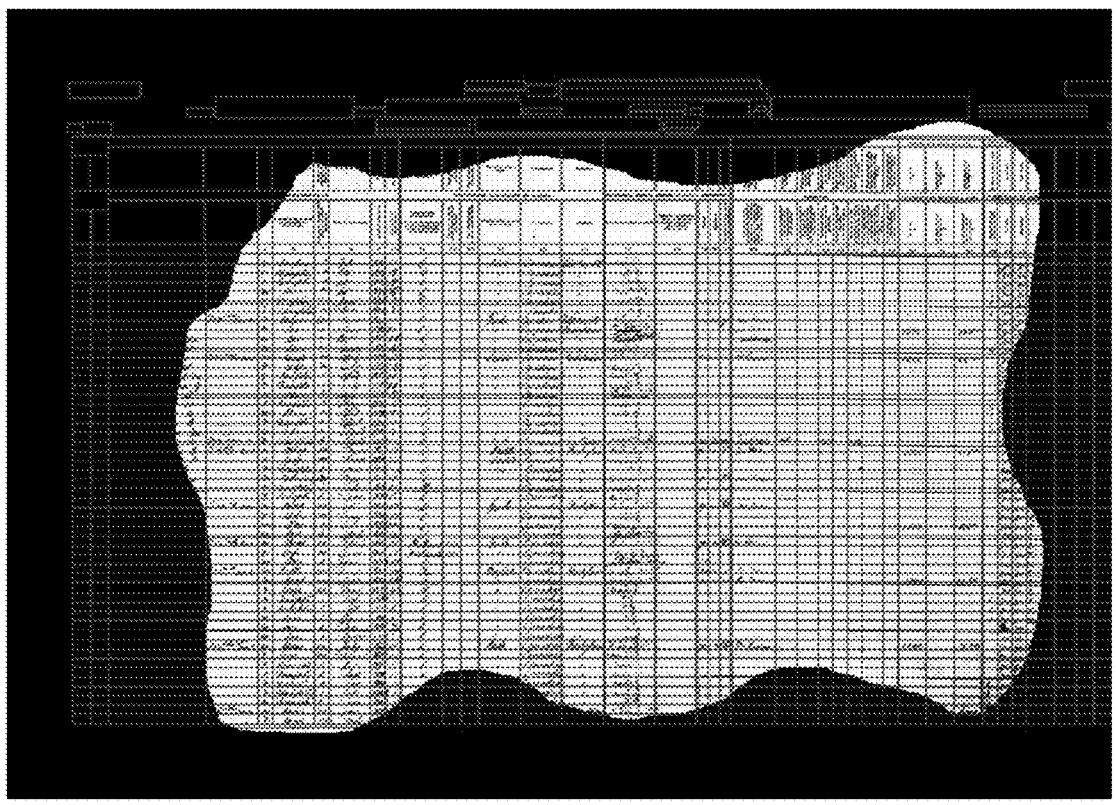
Figure 5D:
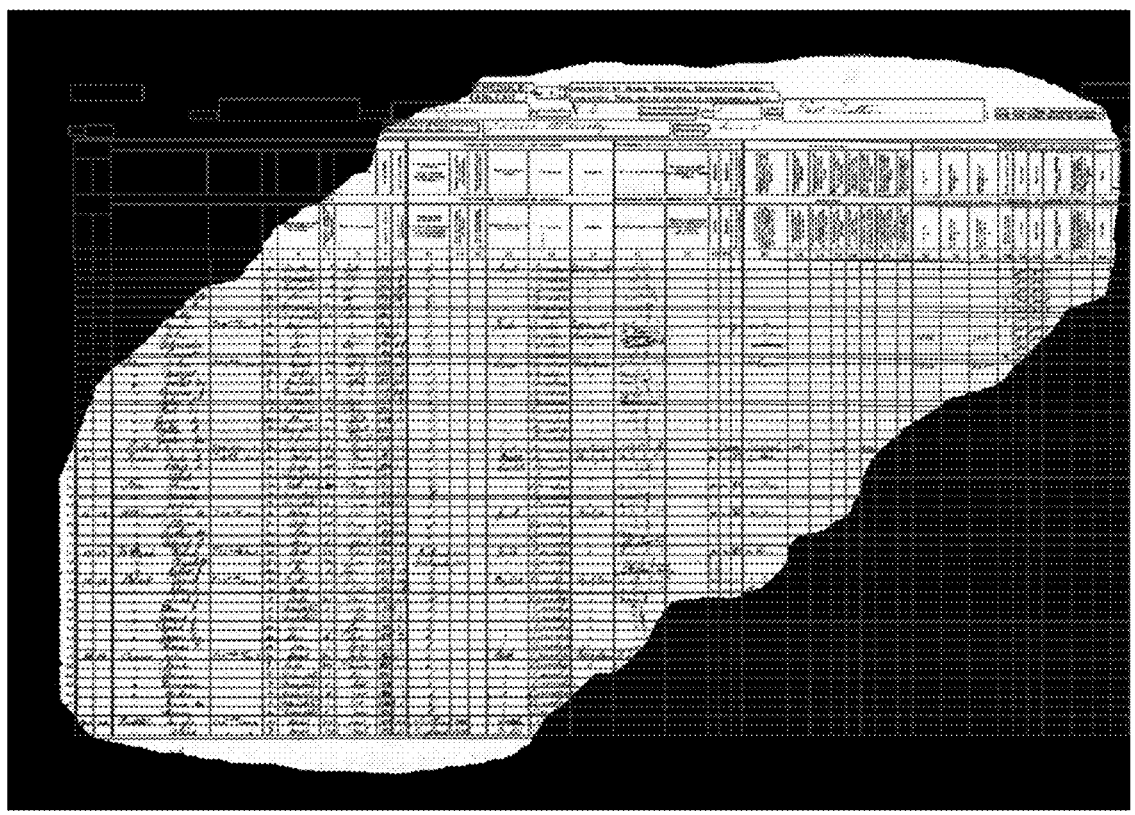
Figure 5E:
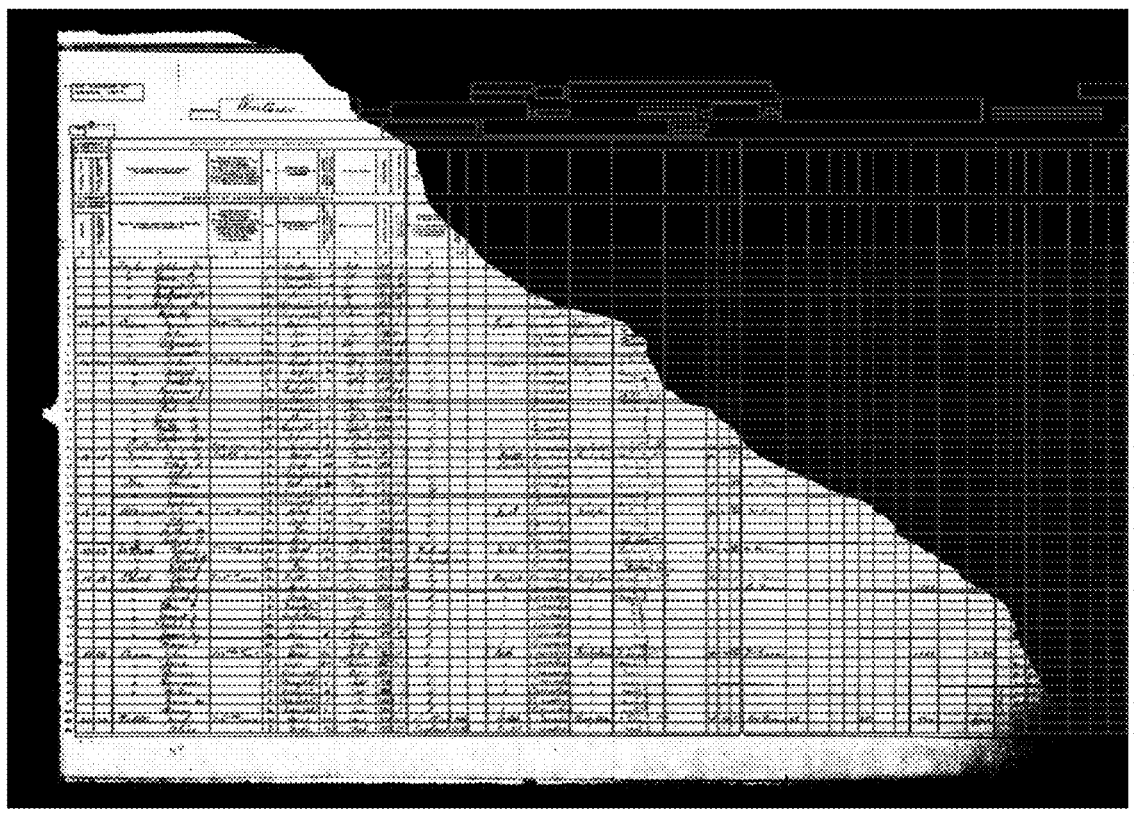
Figure 5F:
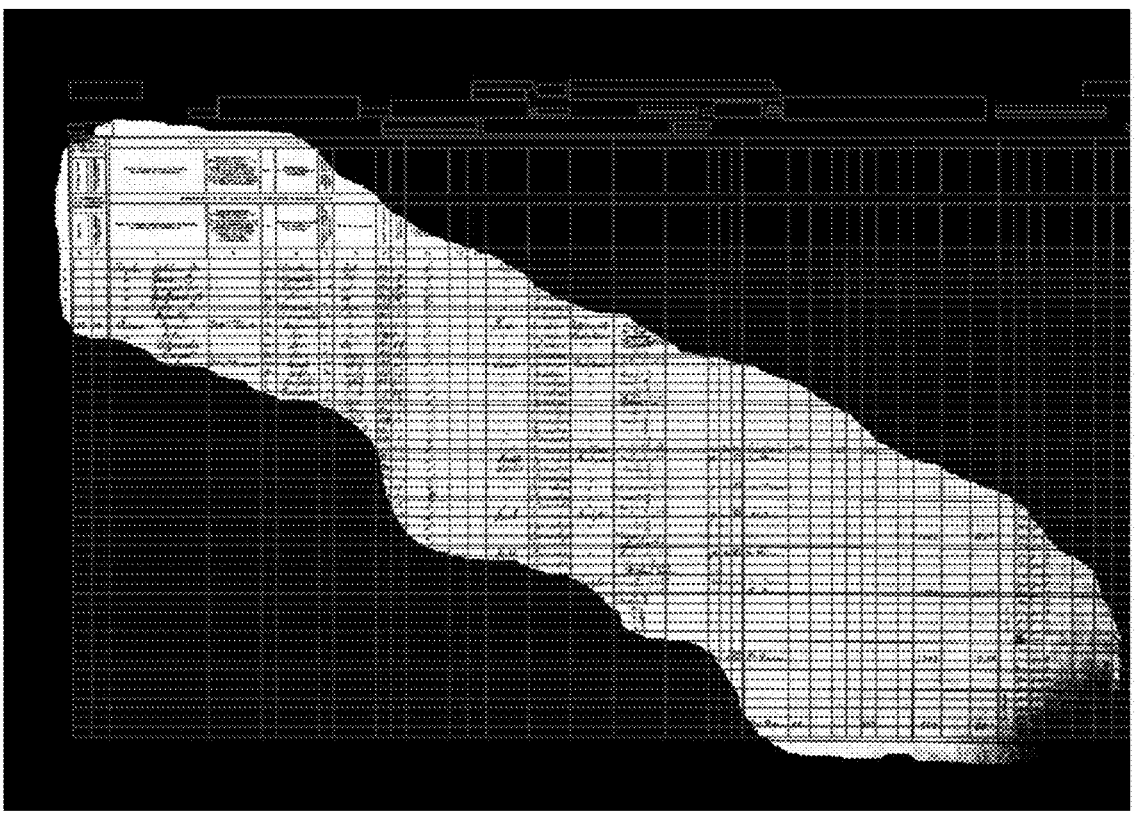
Figure 5G:
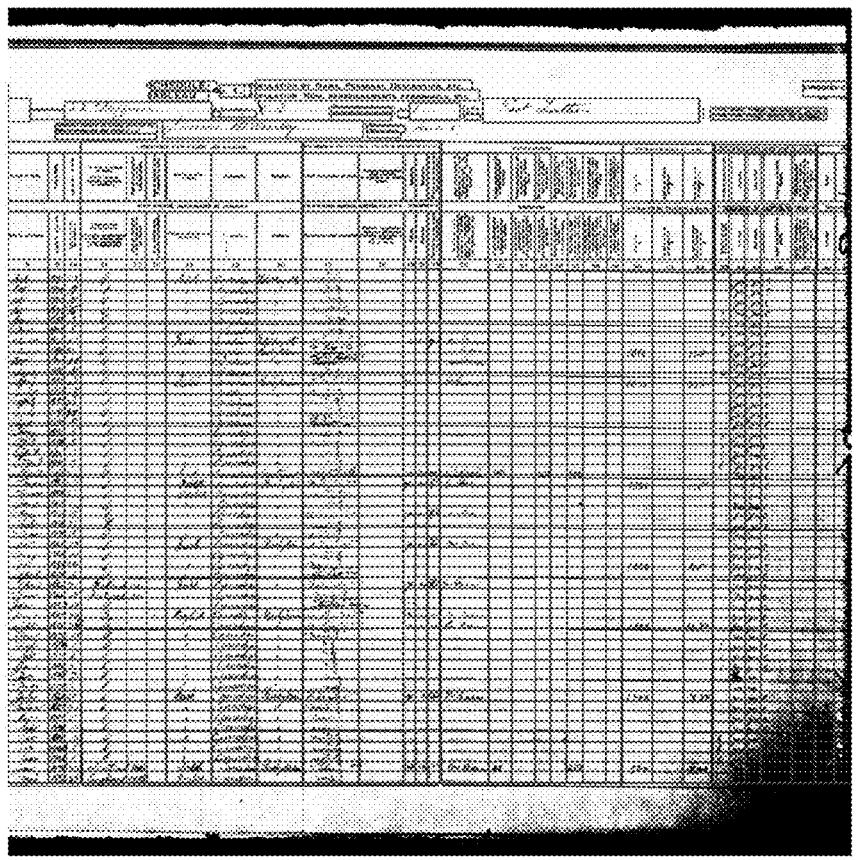
Figure 5H:
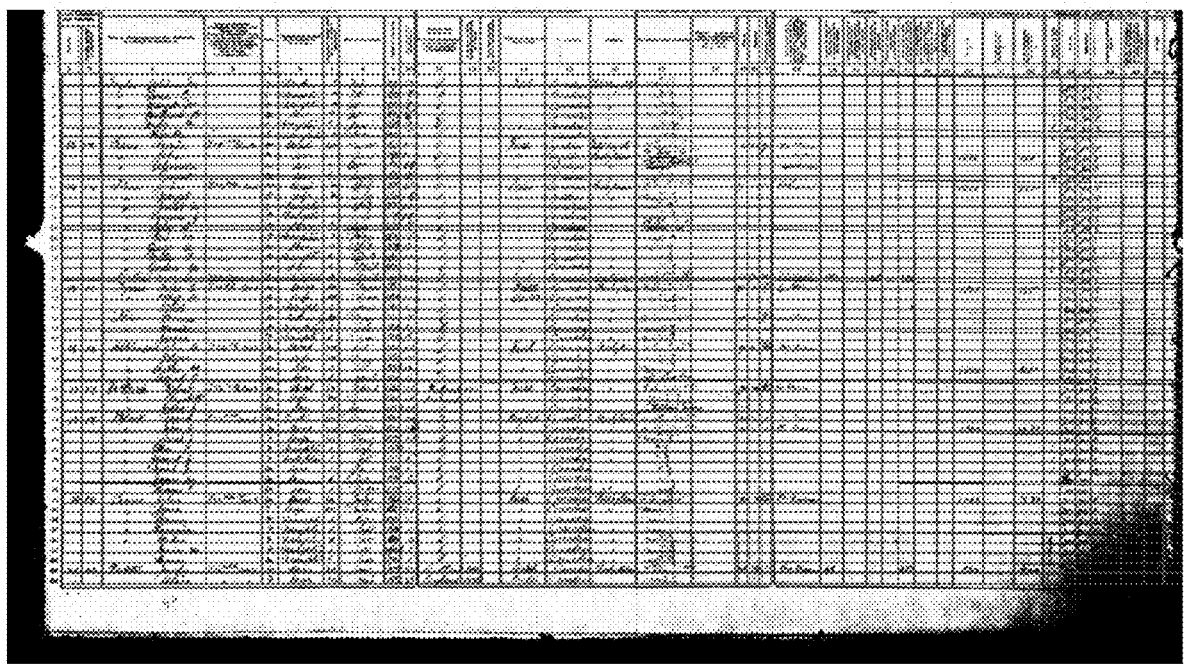

FIGS. 5A-5H illustrate various damaged documents, according to an embodiment of the present disclosure. FIG. 5A illustrates a damaged document with a missing top. FIG. 5B illustrates a damaged document with a missing left side. FIG. 5C illustrates a damaged document with all edges missing. FIG. 5D illustrates a damaged document with multiple corners missing. FIG. 5E illustrates a damaged document with a missing upper right corner. FIG. 5F illustrates a damaged document with more than half of the document missing. FIG. 5G illustrates a damaged document that is over cropped on the left side. FIG. 5H illustrates a damaged document that is over cropped on the top side.

Figure 6:
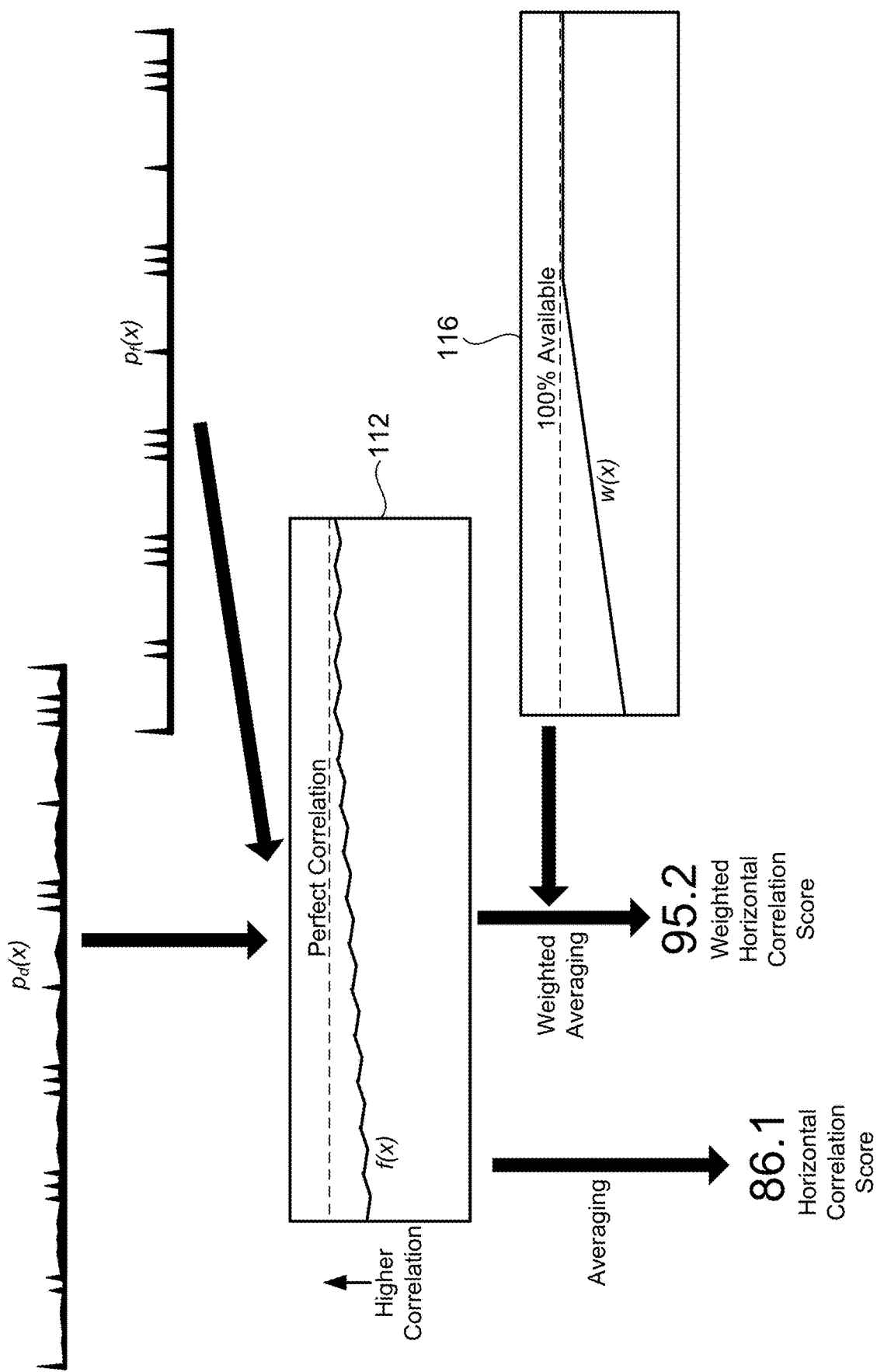
FIG. 6 illustrates a method for calculating a horizontal correlation score, according to an embodiment of the present disclosure.

FIG. 6 illustrates a method for calculating a horizontal correlation score, according to an embodiment of the present disclosure. The horizontal correlation score may be calculated directly from horizontal correlation function 112 by averaging or by summation of horizontal correlation function 112. Alternatively, a weighted horizontal correlation score may be calculated by performing a weighted average of horizontal correlation function 112 using horizontal weighting function 116 as the weights for the averaging.

Figure 7:
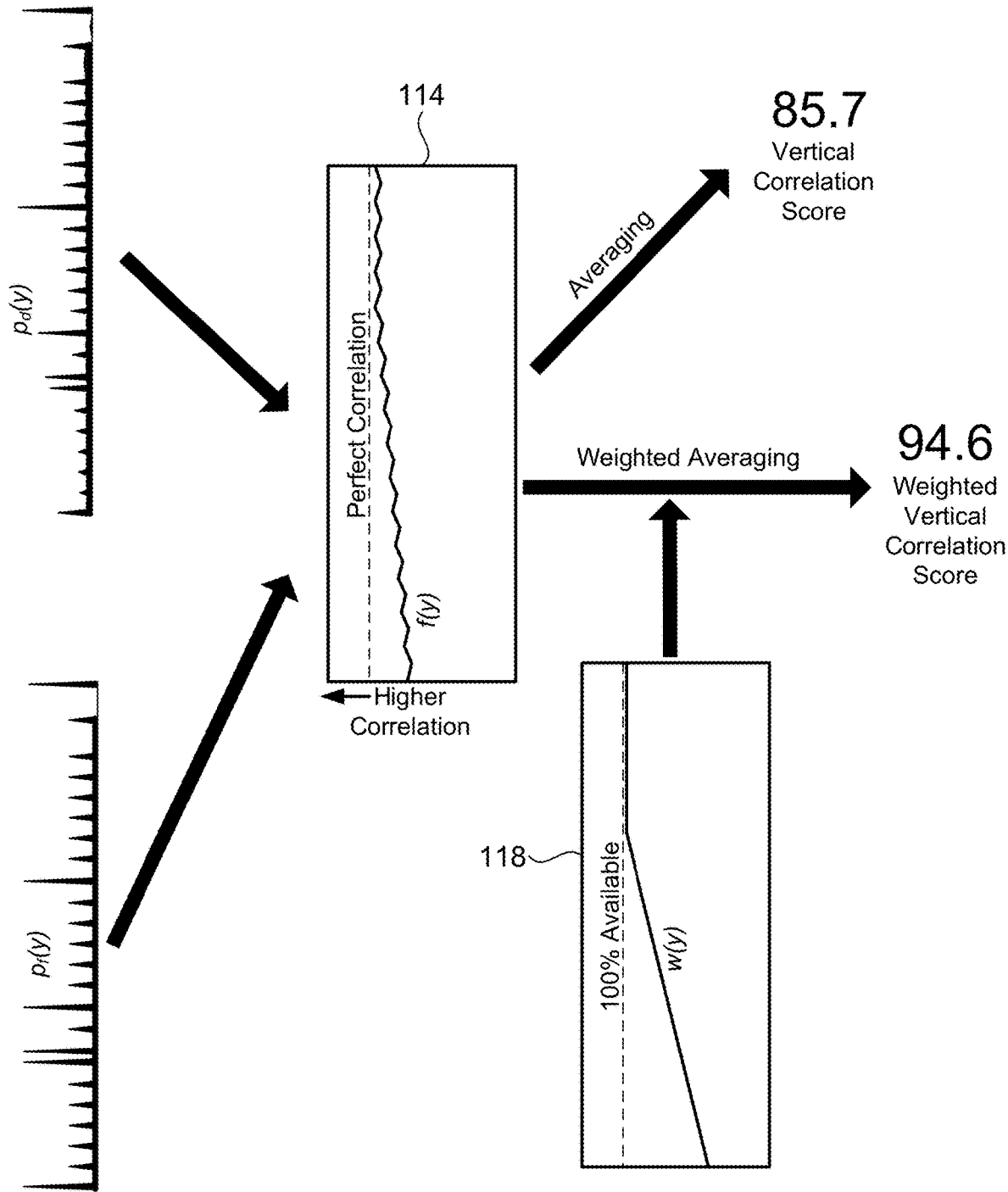
FIG. 7 illustrates a method for calculating a vertical correlation score, according to an embodiment of the present disclosure.

FIG. 7 illustrates a method for calculating a vertical correlation score, according to an embodiment of the present disclosure. Similar to the horizontal correlation score, the vertical correlation score may be calculated directly from vertical correlation function 114 by averaging or by summation of vertical correlation function 114. Alternatively, a weighted vertical correlation score may be calculated by performing a weighted average of vertical correlation function 114 using vertical weighting function 118 as the weights for the averaging.

Figure 8:
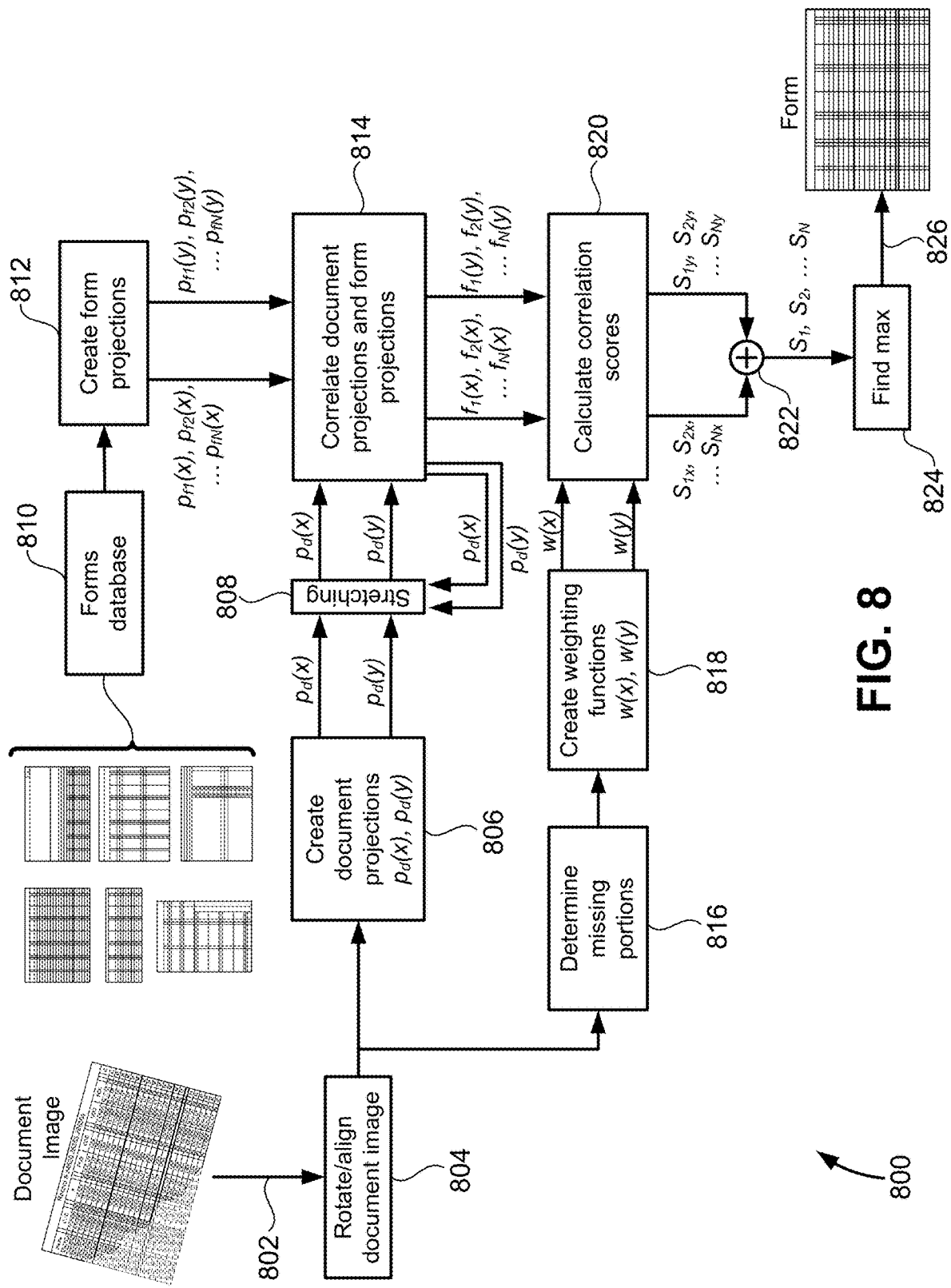
FIG. 8 illustrates a method for registering a document, according to an embodiment of the present disclosure.

FIG. 8 illustrates a method 800 for registering a damaged document, according to an embodiment of the present disclosure. At step 802, a document image is obtained and provided as an input. The document image may be similar to damaged document 102. At step 804, the document image is rotated and/or aligned such that the document image is vertically aligned with the vertical axis and horizontally aligned with the horizontal axis. The orientation of the document is determined by searching for sets of lines that are parallel with each other. At step 806, horizontal document projection $p_d(x)$ and vertical document projection $p_d(y)$ are created as described in reference to FIG. 2. At step 808, the horizontal and vertical document projections are stretched and/or shortened to improve correlation with form projections. At step 810, a forms database is created and/or maintained. The forms database may be similar to database of forms 106, and may contain several possible forms for registering the damaged document. At step 812, each of the forms in the forms database may be projected onto the horizontal and vertical axis to create horizontal form projections $p_{f1}(x)$, $p_{f2}(x)$, ... $p_{fN}(x)$ and vertical form projections $p_{f1}(y)$, $p_{f2}(y)$, ..., $p_{fN}(y)$, where N is the number of forms.

At step 814, horizontal document projection $p_d(x)$ is correlated with horizontal form projections $p_{f1}(x)$, $p_{f2}(x)$, ... $p_{fN}(x)$ to create horizontal correlation functions $f_1(x)$, $f_2(x)$, ... $f_N(x)$ and vertical document projection $p_d(y)$ is correlated with vertical form projections $p_{f1}(y)$, $p_{f2}(y)$, ... $p_{fN}(y)$ to create vertical correlation functions $f_1(y)$, $f_2(y)$, ... $f_N(y)$. For example, horizontal correlation function $f_1(x)$ is the result of correlating horizontal document projection $p_d(x)$ with horizontal form projection $p_{f1}(x)$. Correlating two projections/signals may be performed similar to that described in reference to FIG. 3. In some embodiments, document projections $p_d(x)$ and $p_d(Y)$ are recursively fed back into step 808 where they are again stretched and/or shortened, and then step 814 is repeated with new document projections $p_d(x)$ and $p_d(y)$. Step 814 may be repeated multiple times with new document projections $p_d(x)$ and $p_d(y)$ until the correlation functions are improved. In some embodiments, step 808 not only performs stretching and shrinking but also performs vertical and/or horizontal translation, which may also improve the correlation functions. In some embodiments, step 808 may be performed within step 814.

At step 816, the missing portions of the document image are determined. This may include creating a partitioned document as described in reference to FIG. 4. At step 818, weighting functions $w(x)$ and $w(y)$ are created from the partitioned document as described in reference to FIG. 4. At step 820, correlation scores $S_{1x}$, $S_2$, ... $S_{Nx}$ and $S_{1y}$, $S_{2y}$, ... $S_{Ny}$ are calculated based on correlation functions $f_1(x), f_2(x), \ldots f_N(x)$ and $f_1(y), f_2(y), \ldots f_N(y)$ (e.g., $S_{1x}$ is calculated based on $f_1(x)$). In some embodiments, correlation scores $S_{1x}, S_{2x}, \ldots S_{Nx}$ and $S_{1y}, S_{2y}, \ldots S_{Ny}$ are also based on weighting functions $w(x)$ and $w(y)$, as described in reference to FIGS. 6 and 7, and may be referred to as weighted correlation scores. At step 822, correlation scores $S_{1x}, S_{2x}, \ldots S_{Nx}$ and $S_{1y}, S_{2y}, \ldots S_{Ny}$ are combined to create combined scores $S_1, S_2, \ldots S_N$ (e.g., $S_{1x}$ and $S_{1y}$ are combined to create $S_1$). Correlation scores $S_{1x}, S_{2x}, \ldots S_{Nx}$ and $S_{1y}, S_{2y}, \ldots S_{Ny}$ may be combined by adding the scores together, averaging the scores, or by performing some other mathematical operation on the scores.

At step 824, combined scores $S_1, S_2, \ldots S_N$ are analyzed and a maximum combined score is found. At step 826, the form corresponding to the maximum combined score is identified and used to register the document image. Proper registration of the damaged document allows the information in the damaged document to be recorded, and allows for an account of what data is missing. For example, if the damaged document is a census record, it may be determined that missing portions correspond to a missing name, age, gender, or place of residence.

Figure 9:
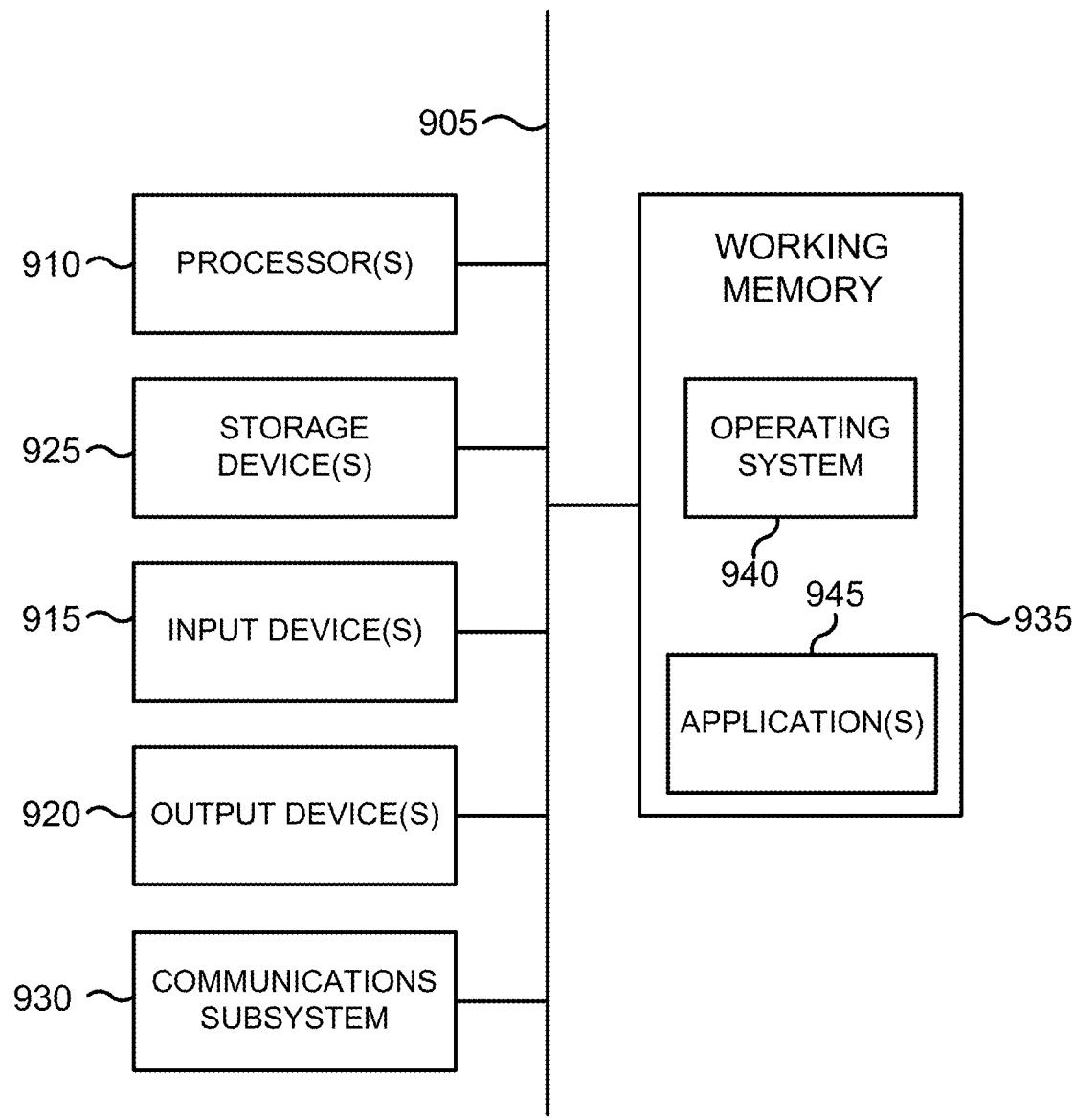
FIG. 9 illustrates a simplified computer system, according to an embodiment of the present disclosure.

FIG. 9 illustrates a simplified computer system 900, according to some embodiments of the present disclosure. A computer system 900 as illustrated in FIG. 9 may be incorporated into devices such as a portable electronic device, mobile phone, or other device as described herein. FIG. 9 provides a schematic illustration of one embodiment of a computer system 900 that can perform some or all of the steps of the methods provided by various embodiments. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905, or may otherwise be in communication, as appropriate. The hardware elements may include one or more processors 910, including without limitation one or more general-purpose processors and/or one or more special-purpose processors such as digital signal processing chips, graphics acceleration processors, and/or the like; one or more input devices 915, which can include without limitation a mouse, a keyboard, a camera, and/or the like; and one or more output devices 920, which can include without limitation a display device, a printer, and/or the like.

The computer system 900 may further include and/or be in communication with one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 930 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 930. In other embodiments, a portable electronic device, e.g. the first electronic device, may be incorporated into the computer system 900, e.g., an electronic device as an input device 915. In some embodiments, the computer system 900 will further comprise a working memory 935, which can include a RAM or ROM device, as described above.

The computer system 900 also can include software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 9, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 925 described above. In some cases, the storage medium might be incorporated within a computer system, such as computer system 900. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 900 to perform methods in accordance with various embodiments of the technology. According to a set of embodiments, some or all of the procedures of such methods are performed by the computer system 900 in response to processor 910 executing one or more sequences of one or more instructions, which might be incorporated into the operating system 940 and/or other code, such as an application program 945, contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 and/or components thereof generally will receive signals, and the bus 905 then might carry the signals and/or the data, instructions, etc. carried by the signals to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A computer-implemented method comprising:
obtaining a document image, the document image being at least two-dimensional;
obtaining one or more form images, wherein each of the one or more form images is at least two-dimensional and includes a plurality of rows and a plurality of columns;
projecting the document image onto a horizontal axis and a vertical axis to create a horizontal document projection and a vertical document projection;
projecting the one or more form images onto the horizontal axis and the vertical axis to create one or more horizontal form projections and one or more vertical form projections;
correlating the horizontal document projection with the one or more horizontal form projections to create one or more horizontal correlation functions and the vertical document projection with the one or more vertical form projections to create one or more vertical correlation functions;
calculating a correlation score for each of the one or more form images based on the one or more horizontal correlation functions and the one or more vertical correlation functions; and
determining which of the one or more form images corresponds to the document image based on a comparison of the correlation score for each of the one or more form images.

2. The computer-implemented method of claim 1, further comprising:
calculating a horizontal correlation score for each of the one or more form images by averaging each of the one or more horizontal correlation functions;
calculating a vertical correlation score for each of the one or more form images by averaging each of the one or more vertical correlation functions;
combining the horizontal correlation score with the vertical correlation score for each of the one or more form images to create combined scores; and
determining which of the one or more form images corresponds to the document image by determining a maximum score of the combined scores.

3. The computer-implemented method of claim 1, further comprising:
determining a missing portion and an available portion of the document image;
determining a horizontal weighting function by projecting the missing portion and the available portion onto the horizontal axis; and
determining a vertical weighting function by projecting the missing portion and the available portion onto the vertical axis.

4. The computer-implemented method of claim 3, further comprising:
calculating a weighted horizontal correlation score for each of the one or more form images by performing a weighted average of each of the one or more horizontal correlation functions using the horizontal weighting function;
calculating a weighted vertical correlation score for each of the one or more form images by performing a weighted average of each of the one or more vertical correlation functions using the vertical weighting function;
combining the weighted horizontal correlation score with the weighted vertical correlation score for each of the one or more form images to create combined scores; and
determining which of the one or more form images corresponds to the document image by determining a maximum score of the combined scores.

5. The computer-implemented method of claim 4, wherein combining the weighted horizontal correlation score with the weighted vertical correlation score includes either adding or averaging the weighted horizontal correlation score and the weighted vertical correlation score.

6. The computer-implemented method of claim 1, further comprising:
rotating the document image such that the document image is vertically aligned with the vertical axis and horizontally aligned with the horizontal axis.

7. The computer-implemented method of claim 1, further comprising:
stretching or shortening the horizontal document projection over the horizontal axis such that the horizontal document projection either increases or decreases in length; or
stretching or shortening the vertical document projection over the vertical axis such that the vertical document projection either increases or decreases in length.

8. The computer-implemented method of claim 1, wherein the document image is an image of a family history document and the one or more form images are images of one or more form types for family history documents.

9. The computer-implemented method of claim 1, wherein calculating the correlation score for each of the one or more form images includes summing each of the one or more horizontal correlation functions and each of the one or more vertical correlation functions.

10. A computer readable storage media comprising instructions to cause one or more processors to perform operations comprising:
obtaining a document image, the document image being at least two-dimensional;
obtaining one or more form images, wherein each of the one or more form images is at least two-dimensional and includes a plurality of rows and a plurality of columns;
projecting the document image onto a horizontal axis and a vertical axis to create a horizontal document projection and a vertical document projection;
projecting the one or more form images onto the horizontal axis and the vertical axis to create one or more horizontal form projections and one or more vertical form projections;
correlating the horizontal document projection with the one or more horizontal form projections to create one or more horizontal correlation functions and the vertical document projection with the one or more vertical form projections to create one or more vertical correlation functions;
calculating a correlation score for each of the one or more form images based on the one or more horizontal correlation functions and the one or more vertical correlation functions; and determining which of the one or more form images corresponds to the document image based on a comparison of the correlation score for each of the one or more form images.

11. The computer readable storage media of claim 10, wherein the operations further comprise:
calculating a horizontal correlation score for each of the one or more form images by averaging each of the one or more horizontal correlation functions;
calculating a vertical correlation score for each of the one or more form images by averaging each of the one or more vertical correlation functions;
combining the horizontal correlation score with the vertical correlation score for each of the one or more form images to create combined scores; and
determining which of the one or more form images corresponds to the document image by determining a maximum score of the combined scores.

12. The computer readable storage media of claim 10, wherein the operations further comprise:
determining a missing portion and an available portion of the document image;
determining a horizontal weighting function by projecting the missing portion and the available portion onto the horizontal axis; and
determining a vertical weighting function by projecting the missing portion and the available portion onto the vertical axis.

13. The computer readable storage media of claim 12, wherein the operations further comprise:
calculating a weighted horizontal correlation score for each of the one or more form images by performing a weighted average of each of the one or more horizontal correlation functions using the horizontal weighting function;
calculating a weighted vertical correlation score for each of the one or more form images by performing a weighted average of each of the one or more vertical correlation functions using the vertical weighting function;
combining the weighted horizontal correlation score with the weighted vertical correlation score for each of the one or more form images to create combined scores; and
determining which of the one or more form images corresponds to the document image by determining a maximum score of the combined scores.

14. The computer readable storage media of claim 10, wherein calculating the correlation score for each of the one or more form images includes summing each of the one or more horizontal correlation functions and each of the one or more vertical correlation functions.

15. A system comprising:
one or more processors; and
one or more computer readable storage mediums comprising instructions to cause the one or more processors to perform operations comprising:
obtaining a document image, the document image being at least two-dimensional;
obtaining one or more form images, wherein each of the one or more form images is at least two-dimensional and includes a plurality of rows and a plurality of columns;
projecting the document image onto a horizontal axis and a vertical axis to create a horizontal document projection and a vertical document projection;
projecting the one or more form images onto the horizontal axis and the vertical axis to create one or more horizontal form projections and one or more vertical form projections;
correlating the horizontal document projection with the one or more horizontal form projections to create one or more horizontal correlation functions and the vertical document projection with the one or more vertical form projections to create one or more vertical correlation functions;
calculating a correlation score for each of the one or more form images based on the one or more horizontal correlation functions and the one or more vertical correlation functions; and
determining which of the one or more form images corresponds to the document image based on a comparison of the correlation score for each of the one or more form images.

16. The system of claim 15, wherein the operations further comprise:
calculating a horizontal correlation score for each of the one or more form images by averaging each of the one or more horizontal correlation functions;
calculating a vertical correlation score for each of the one or more form images by averaging each of the one or more vertical correlation functions;
combining the horizontal correlation score with the vertical correlation score for each of the one or more form images to create combined scores; and
determining which of the one or more form images corresponds to the document image by determining a maximum score of the combined scores.

17. The system of claim 15, wherein the operations further comprise:
determining a missing portion and an available portion of the document image;
determining a horizontal weighting function by projecting the missing portion and the available portion onto the horizontal axis; and
determining a vertical weighting function by projecting the missing portion and the available portion onto the vertical axis.

18. The system of claim 17, wherein the operations further comprise:
calculating a weighted horizontal correlation score for each of the one or more form images by performing a weighted average of each of the one or more horizontal correlation functions using the horizontal weighting function;
calculating a weighted vertical correlation score for each of the one or more form images by performing a weighted average of each of the one or more vertical correlation functions using the vertical weighting function;
combining the weighted horizontal correlation score with the weighted vertical
correlation score for each of the one or more form images to create combined scores; and
determining which of the one or more form images corresponds to the document image by determining a maximum score of the combined scores.

19. The system of claim 15, wherein the operations further comprise:
rotating the document image such that the document image is vertically aligned with the vertical axis and horizontally aligned with the horizontal axis.

20. The system of claim 15, wherein calculating the correlation score for each of the one or more form images includes summing each of the one or more horizontal correlation functions and each of the one or more vertical correlation functions.

* * * * *